(12) United States Patent     (10) Patent No.: US 9,368,274 B2
Xu et al.     (45) Date of Patent: Jun. 14, 2016

(54) RESONANCE-BASED WIRELESS POWER TRANSFER SYSTEM

(71) Applicants: HUAZHONG UNIVERSITY OF SCIENCE AND TECHNOLOGY, Wuhan (CN); University of Pittsburgh, Pittsburgh, PA (US)

(72) Inventors: Qi Xu, Wuhan (CN); Mingui Sun, Pittsburgh, PA (US); Hao Wang, Pittsburgh, PA (US); Zhihong Mao, Sewickley, PA (US); Jiping He, Tempe, AZ (US)

(73) Assignees: Huazhong University of Science and Technology, Wuhan (CN); UNIVERSITY OF PITTSBURGH, Pittsburgh ( * ) Notice: Subject to any disclaimer, the term of this patent is extended or adjusted under 35 U.S.C. 154(b) by 557 days.

(21) Appl. No.: 13/844,838

(22) Filed: Mar. 16, 2013

(65) Prior Publication Data
US 2013/0293025 A1     Nov. 7, 2013

(30) Foreign Application Priority Data

Apr. 11, 2012     (CN) .......................... 2012 1 0104018

(51) Int. Cl.
    *H01F 38/14*     (2006.01)
    *H02J 17/00*     (2006.01)
(52) U.S. Cl.
    CPC ................ *H01F 38/14* (2013.01); *H02J 17/00* (2013.01)
(58) Field of Classification Search
    CPC ................................ H01F 38/14; H02J 17/00
    See application file for complete search history.

(56) References Cited

U.S. PATENT DOCUMENTS

| 4,528,748 | A | * | 7/1985 | Eichelberger | ........ H05K 3/0014 29/829 |
| 4,906,973 | A | * | 3/1990 | Karbowski | ......... G08B 13/2474 324/233 |
| 5,749,912 | A | * | 5/1998 | Zhang | ................ A61N 1/36032 607/55 |
| 6,114,937 | A | * | 9/2000 | Burghartz | ........... H01F 17/0006 336/200 |
| 6,297,736 | B1 | * | 10/2001 | Lewis | ...................... G01V 3/08 324/326 |
| 6,452,249 | B1 | * | 9/2002 | Maeda | .............. H01L 21/28518 257/347 |
| 7,078,997 | B2 | * | 7/2006 | Toyomura | ............... H01F 30/06 336/192 |
| 7,289,855 | B2 | * | 10/2007 | Nghiem | ............... A61B 5/0031 128/897 |

(Continued)

*Primary Examiner* — Thienvu Tran
*Assistant Examiner* — Pinping Sun
(74) *Attorney, Agent, or Firm* — Matthias Scholl, PC; Matthias Scholl

(57) ABSTRACT

A wireless power transfer system including a driver coil array, a hexagonally-packed transmitter mat, a receiver coil, and a load coil for powering a medical implant. The magnetically coupled resonance between two isolated parts is established by an array of primary coils and a single small secondary coil to create a transcutaneous power link for implanted devices as moving targets. The primary isolated part includes a driver coil array magnetically coupled to a mat of hexagonally packed primary coils. Power is injected by the driver coils into the transmitter coils in the transmitter mat to maintain resonance in the presence of losses and power drawn by the receiver coil from the magnetic field. The implanted secondary isolated part includes a receiver coil magnetically coupled to a load coil. A rectification/filter system is connected to the load coil supplying DC power to the electronic circuits of the implant.

16 Claims, 20 Drawing Sheets

(56) References Cited

U.S. PATENT DOCUMENTS

| | | | |
|---|---|---|---|
| 7,291,956 B2 * | 11/2007 | Itoh | H02K 3/26 310/208 |
| 8,134,440 B2 * | 3/2012 | Beckenbach | H05G 2/00 315/5.35 |
| 8,519,668 B2 * | 8/2013 | Hui | H01F 17/0006 320/108 |
| 2010/0207399 A1 * | 8/2010 | Grandics | H01Q 1/248 290/1 R |
| 2011/0101788 A1 * | 5/2011 | Sun | H04B 5/0037 307/104 |
| 2012/0032678 A1 * | 2/2012 | Vaughan, Jr. | G01R 33/3415 324/318 |
| 2013/0069444 A1 * | 3/2013 | Waffenschmidt | H01R 13/514 307/104 |

* cited by examiner

RESONANCE-BASED WIRELESS POWER TRANSFER SYSTEM

CROSS-REFERENCE TO RELATED APPLICATIONS

Pursuant to 35 U.S.C. §119 and the Paris Convention Treaty, this application claims the benefit of Chinese Patent Application No. 201210104018.7 filed Apr. 11, 2012, the contents of which are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to the wireless delivery of energy, and in particular to a wireless power transfer system that allows energy, such as RF energy, to be transferred wirelessly to moving targets using nonradioactive resonant coupling.

2. Description of the Related Art

In recent years, rapid technological advances in microelectronics, nanotechnology and MEMS technology have spurred new types of implanted devices. Implantable devices have become increasingly popular in modern medicine. These devices have a wide range of applications, such as health monitoring, disease prevention, delivery of a therapeutic regimen, and biomimetic prosthesis. For example, the deep brain stimulation (DBS) device is used as a brain implant for treating Parkinson's disease and tremor; electrical stimulation of nerve tissue and recording of neural electrical activity are the basis of emerging prostheses and treatments for spinal cord injury, stroke, sensory deficits, and neurological disorders. However, supplying electrical power to implants within a biological body (e.g., a human or an animal) has remained a significant problem.

Despite improvements in energy density of implantable batteries, periodic surgeries are still required to replace a depleted battery, which involves high cost and surgical risks. For example, the expected life of implanted devices for the treatment of epilepsy produced by Inc. Cyberonics, U.S.A., is no more than 8 years due to the limited battery capacity; the battery in deep brain stimulators manufactured by Inc. Medtronic, U.S.A., require surgical intervention to replace the entire device after depletion. The total charge for this surgical procedure is approximately $25,000, which has been described as "the world's most expensive battery change". On the other hand, for artificial hearts with high power requirement, energy is commonly provided by external batteries through percutaneous wires susceptible to infection and a limited range of movement. In cases where rechargeable batteries are used to support implants, successful application is currently limited as a result of various issues related to the size, weight, longevity, toxicity and safety of batteries.

Wireless power transfer (WPT) is a promising technology for a variety of implantable devices. This technology reduces not only the risk of infection due to cables passing through the skin, but also the size of the device so that powering an implant no longer depends on the battery. Up to the present, based on magnetic coupling, the amount of wireless power that can be delivered transcutaneously to the animal in a reliable fashion has been too small for most stimulation implants, and the feasibility of performing WPT while allowing free motion of the laboratory animal within a relatively large experimental site has remained unproven.

Wireless electricity represents a new WPT technique based on strongly coupled resonance via evanescent fields in the midrange of coil separation. The resonant interaction between the transmitter and receiver can be strongly established, allowing a relatively high WPT efficiency even when misalignment arises due to operating conditions in a real-world scenario. Moreover, a resonance-based WPT system can reduce energy dissipation into biological tissues because such tissues are off-resonant at the operating frequency.

A typical wireless energy transfer system includes wearable transmitter coils to transcutaneously power implantable devices. The system is also used to power a wireless sensor network embedded within the clothes in the medical and military fields. However, in order for wireless electricity to be used for powering implanted medical devices, the user must always carry a radio frequency amplifier and wear transmitter coils, posing major restrictions on his/her free movement. This is inconvenient as well as unsuitable for experimental animals.

In other consumer and industrial applications, a wireless charging platform based on wireless power transfer can recharge electronic devices such as laptop, cell phone, and media player, etc. Moreover, wireless power transfer can used to deliver the energy from a solar panel outside a residential house to the inside without a cable through the construction wall or roof. The applications of wireless power transfer also extend to powering a robot or an electric vehicle (EV) by a series of thin energy cells under the floor or paved road, recharging EVs by an unobtrusive wireless charger "mat" on the garage floor, or transferring solar energy to the inside of a parking car to power ventilation fans in order to keep the inside temperature from rising too high.

SUMMARY OF THE INVENTION

In one embodiment, the invention provides a wireless power transfer system that comprises a driver coil array, a hexagonally packed transmitter mat, a receiver coil, and a load coil for powering a medical implant. The magnetically coupled resonance between two isolated parts is established by an array of primary coils and a single small secondary coil to create a transcutaneous power link for implanted devices as moving targets. The primary isolated part comprises a driver coil array magnetically coupled to a mat of hexagonally packed primary coils. Power is injected by the driver coils into the transmitter coils in the transmitter mat to maintain resonance in the presence of losses and power drawn by the receiver coil from the magnetic field. The implanted secondary isolated part comprises a receiver coil magnetically coupled to a load coil. A rectification/filter system is connected to the load coil supplying DC power to the electronic circuits of the implant. Each driver coil-primary coil pair forms a voltage step-up transformer to produce a strong resonance for wireless power delivery to the secondary coils implanted within the animal body.

In another embodiment, the circular or hexagonal spiral coil shape is utilized in a transmitter mat. The primary coils are grouped into standard cells, allowing users to build experimental stations in different sizes and shapes by adjusting the number of standard cells. A mat serves as an external source composed of a single or multiple hexagonal cells. Each cell has standard input impedance and power requirements, facilitating the design of a power amplifier and other system components. The design of driver coils is standardized to a seven-element loop array structure for each hexagonal cell in the transmitter mat. The loops are all connected in parallel to a pair of concentric rings which are further connected to the output of a radio-frequency (RF) power amplifier. A gap is made at each ring to avoid the harmful loop current generated by the RF magnetic field.

In another embodiment, the loops are individually connected to an electronic switching circuit. The output of the RF power amplifier is connected to this circuit which determines which loops are activated. This embodiment controls the position of power delivery to track a moving target, e.g., an EV. FIG. 12 shows an example where three active coils (indicated by bold lines) are in close proximity to receiver coil. In this embodiment, three out of seven coils transmit power within the allowing optimal wireless power transfer by automatic tracking of the parking position of the car.

In still another embodiment, a secondary coil consists of two planar sub-coils and one helical sub-coil combined into a single coil with a shape resembling a shallow box. A secondary coil serves both as a packaging cover for the implant and a power receiver coil, allowing minimization of device size and weight to facilitate implantation without severely affecting the mobility of the subject. This receiver coil design allows the use of wires with larger diameters or special forms, such as multi-strand wires (Litz wire) and film strips, to enhance performance at radio frequencies. By choosing different geometric designs for the sub-coils, different shapes of boxes can be obtained. The exterior of the box is coated or covered by a biocompatible material for biological safety.

In another embodiment, a magnetically coupled resonant system consists of a driver-coil array, a mat of hexagonally packed primary-coil array, a small secondary coil, and a load coil for powering medical implants. Also, in this preferred embodiment, an array of transmitter coils forms a mat within a fenced region where laboratory animals can move freely whilst carrying implants operated by wireless electricity. The power mat creates a nearly uniform magnetic field at the height of the implants throughout the fenced region. Regardless of the nature or duration of animal locomotion, the magnetic flux produced by the transmitter array is stable, the distance of the primary and secondary coils is roughly unchanged, and the two coils remain in favorable orientations to each other (parallel or nearly parallel). If many free-moving animals are utilized in a single experimental study, one power source can be used to operate all implants simultaneously. If a single animal is studied, power can be delivered to a mat cell where the animal is located. A target position tracking device (e.g. digital camera) is used to determine which standard hexagonal cell in the mat is to be individually powered.

In yet another embodiment, a power mat comprises a single or multiple hexagonal cells as an external source. Each cell contains a group of spiral coils of a certain shape (e.g., a circular, hexagonal, or fan shape). Also, in this preferred embodiment, each cell contains seven planar spiral coils (PSCs) arranged in hexagonal form. Each circular coil is constructed by a hexagonal printed circuit board (PCB). On the reverse side of each PSC, several conductor strips were utilized to form distributed capacitances with respect to the coil on the front side. By changing the sizes and patterns of these strips, the resonant frequencies and Q-factors of the PSCs can be readily adjusted.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like references numerals designate like or corresponding parts.

DETAILED DESCRIPTION OF THE EMBODIMENTS

Figure 1:
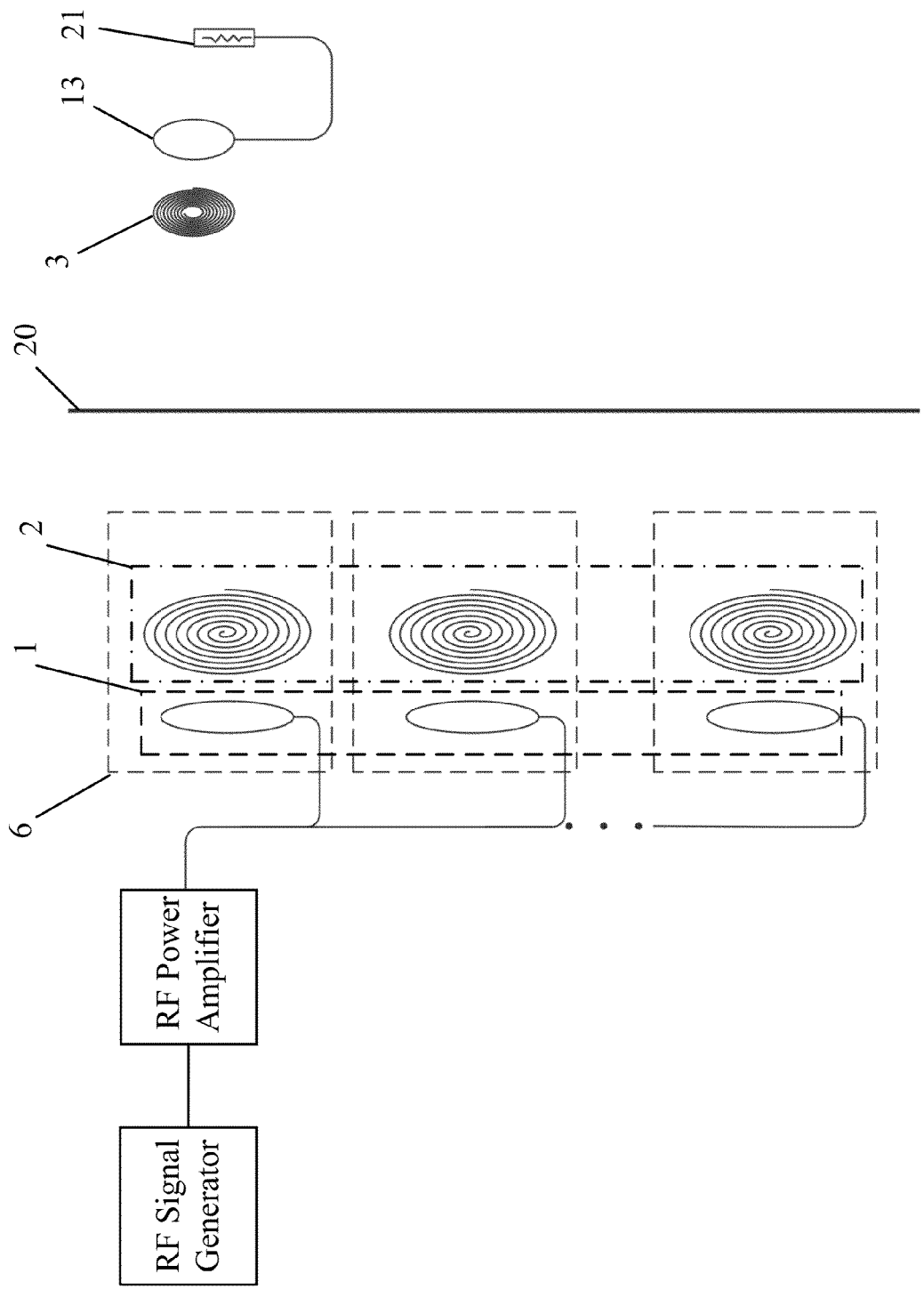
FIG. 1 is a block diagram of a wireless power transfer system via magnetically resonant coupling according to one embodiment of the invention for powering a medical implant.

FIG. 1 is a block diagram of a wireless electricity system according to one embodiment of the invention. As described in greater detail elsewhere herein, the wireless electricity system allows power to be transferred wirelessly from a source to a load based on the concept of evanescent resonant coupling mediated through the overlap of the nonradioactive near (e.g., magnetic) fields of two resonators (referred to as nonradioactive resonant coupling). In particular, in the scheme employed by the wireless electricity system, the coupling is implemented by the evanescent lossless stationary near-field rather than the lossy radiative far-field.

Referring to FIG. 1, the wireless electricity system for powering a medical implant comprises an RF signal generator operatively connected to a power amplifier. The RF signal generator generates an RF energy signal, which is amplified by the power amplifier to provide amplified RF energy signal. The wireless electricity system also comprises a transmitter coil array 2 acting as an energy transmitter and a receiver coil 3 separated from the transmitter coil array by the skin 20 and acting as an energy receiver. The transmitter coil array 2 and the receiver coil 3 have the same resonant frequency or frequencies. A driver coil array 1 is operatively coupled to the transmitter coil array 2 for injecting RF energy to maintain resonance in the presence of losses and power drawn by the receiver coil. Each driver coil and primary coil pair forms a voltage step-up transformer 6 to produce a strong resonance for wireless power delivery to the receiver coil 3 within the body. A load coil 13 is operatively coupled to the receiver coil 3 for receiving RF energy.

In operation, as shown schematically in FIG. 1, the transmitter coil array 2 receives the amplified RF energy signal by a driver coil array 1 and causes RF energy to be wirelessly transferred between the transmitter coil array 2 and the implanted receiver coil 3 in the evanescent lossless stationary near-field. In response to receiving the RF energy and in a manner described elsewhere herein, the RF energy is output to the load coil 13 from the secondary receiver coil 3, and received by the load 21. In one embodiment, the load 21 comprises a rectifier/filter for converting the received RF energy to DC power for powering the electronic circuits of the implant.

Figure 2:
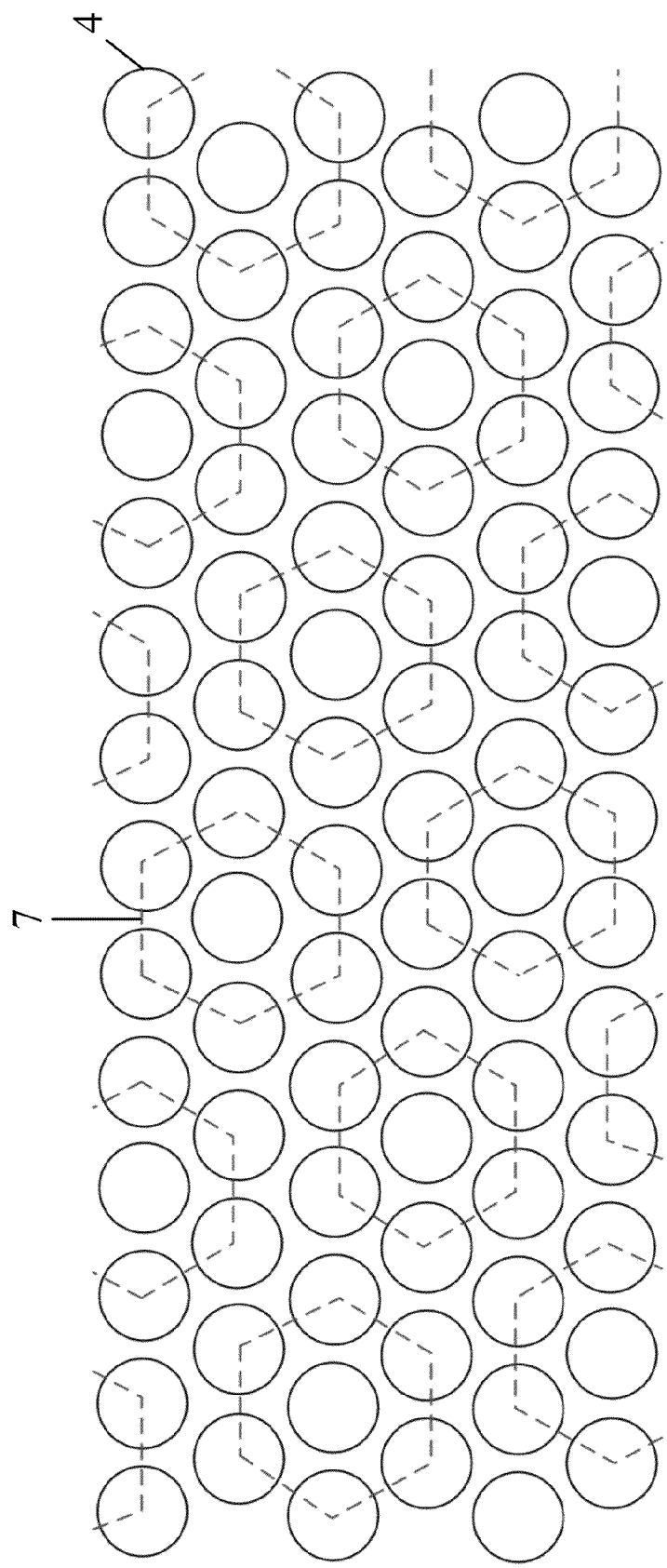
FIG. 2 is a schematic diagram of an embodiment of a general driver coil array that may be employed in, for example, the system of FIG. 1.

FIG. 2 is a schematic diagram of an embodiment of a general driver coil array that may be used for the drive coil array. As seen in FIG. 2, the driver coil array comprises a number of hexagonal elements 7 and each element consists of seven loops 4. The applied RF energy, through magnetic coupling between the driver coil array and the transmitter coil array, is injected to maintain resonance in the presence of losses and power drawn by the receiver coil.

Figure 3A:
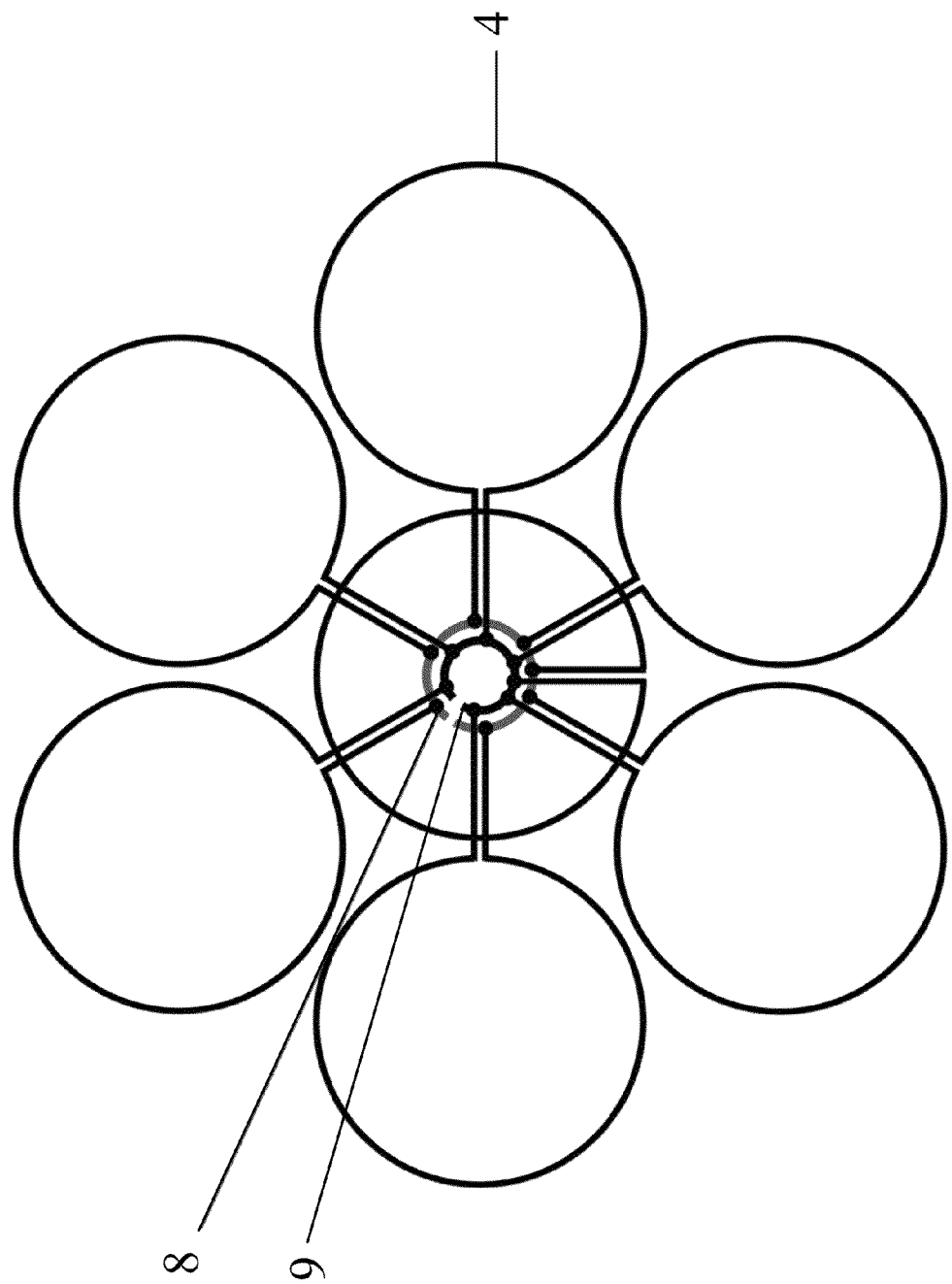
FIGS. 3A and 3B are schematic diagrams of an embodiment of a seven-element loop array that may be employed in, for example, the driver coil array of FIG. 2.
Figure 3B:
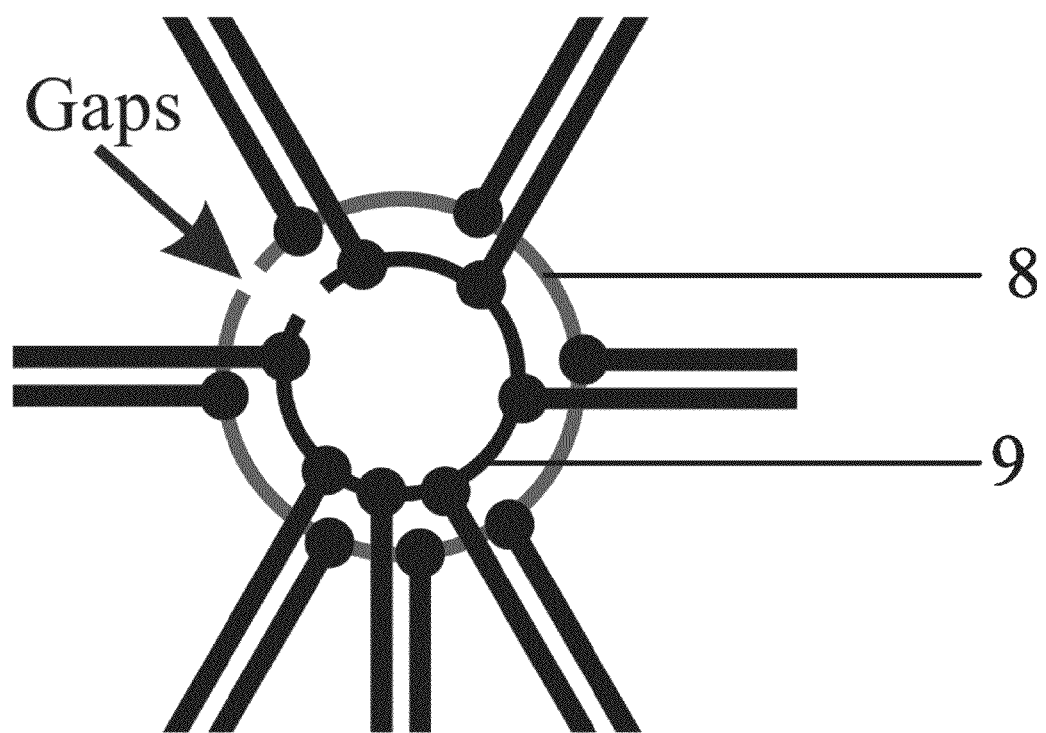

FIGS. 3A and 3B are schematic diagrams of an embodiment of a hexagonal seven-loop element used for the driver coil array 1. The loops 4 are all connected in parallel to a pair of open coaxial conductor rings 8 and 9 which are further connected to the output of an RF power amplifier. A gap is made at each ring to avoid the harmful loop current generated by the RF magnetic field.

Figure 4:
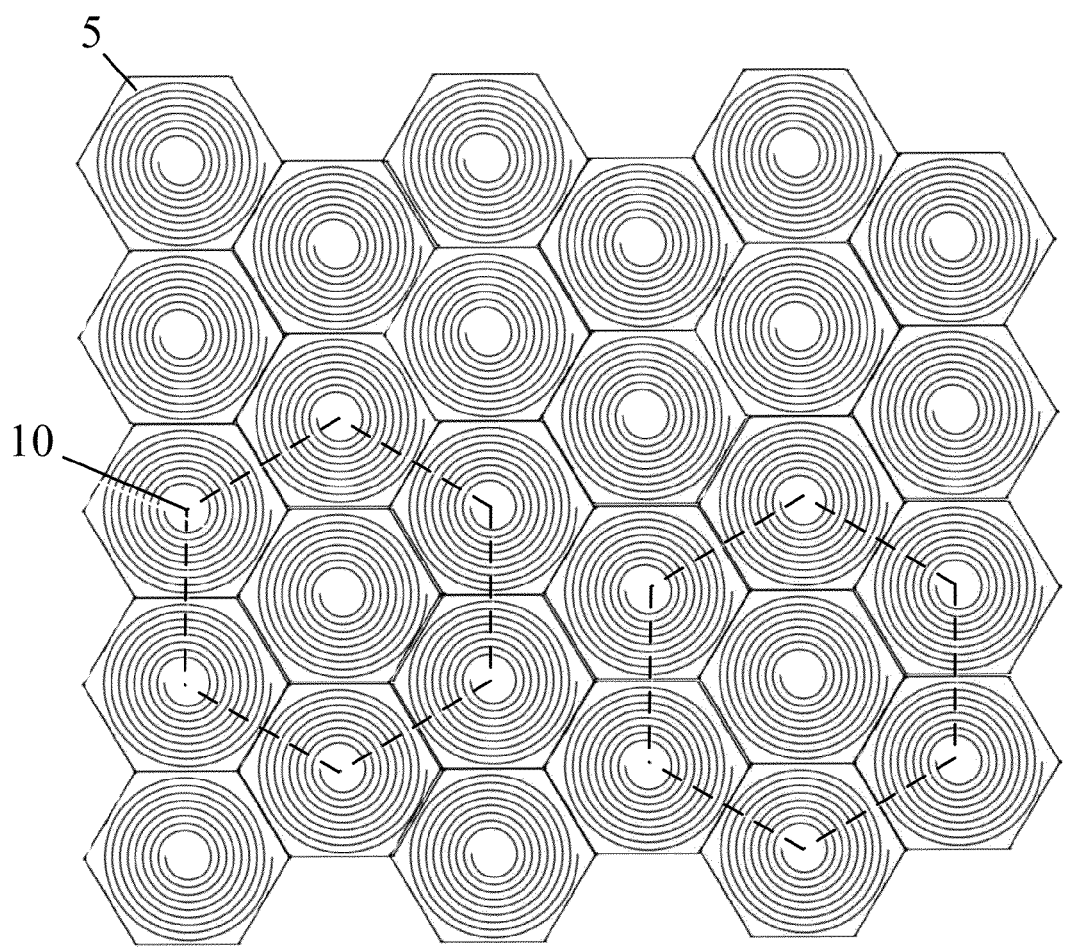
FIG. 4 is a schematic diagram of an embodiment of a mat of hexagonally packed primary coils that may be employed in, for example, the system of FIG. 1.

FIG. 4 is a schematic diagram of an embodiment of a mat of hexagonally packed primary coils used for the transmitter coil array. The primary coils 5 of the mat are grouped into standard hexagonal cells 10. Each seven-coil cell 10 comprises seven coils 5 constructed by hexagonal PCBs, a number of particular embodiments of which are described herein. The magnetically resonant coupling between the transmitter coil array and the receiver coil as a moving target causes RF energy of the same particular frequency or frequencies to be induced in and radiated by the receiver coil.

Figure 5A:
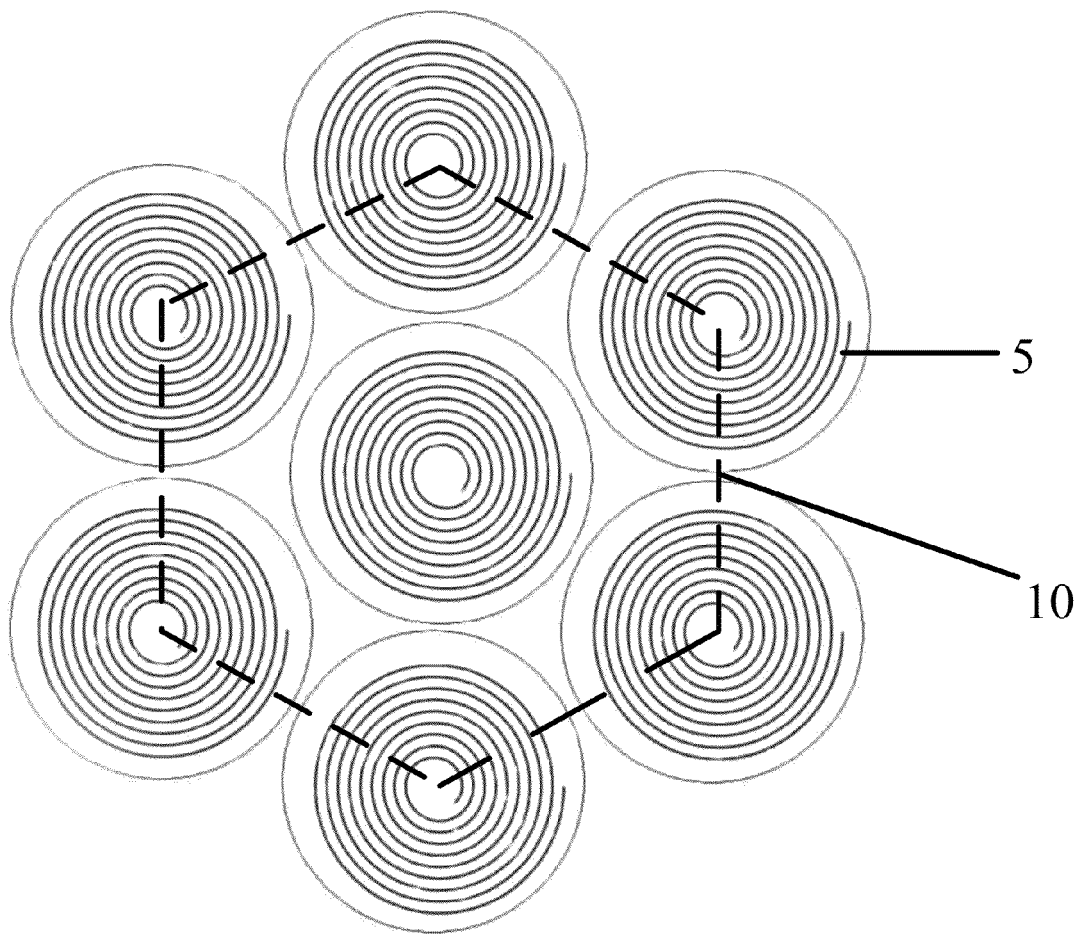
FIGS. 5A, 5B, and 5C are top plan views of standard seven-coil cells that may be employed in the mat of FIG. 4 according to further alternative embodiments.
Figure 5B:
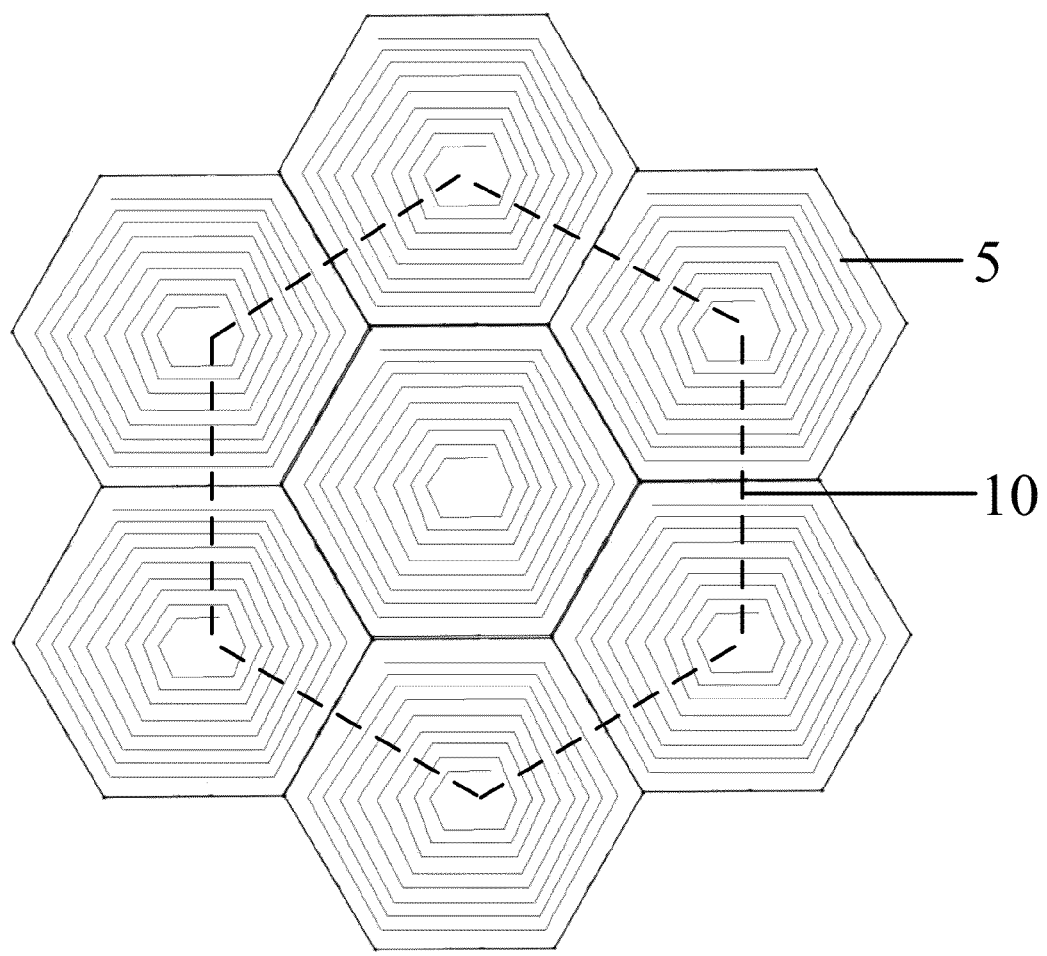
Figure 5C:
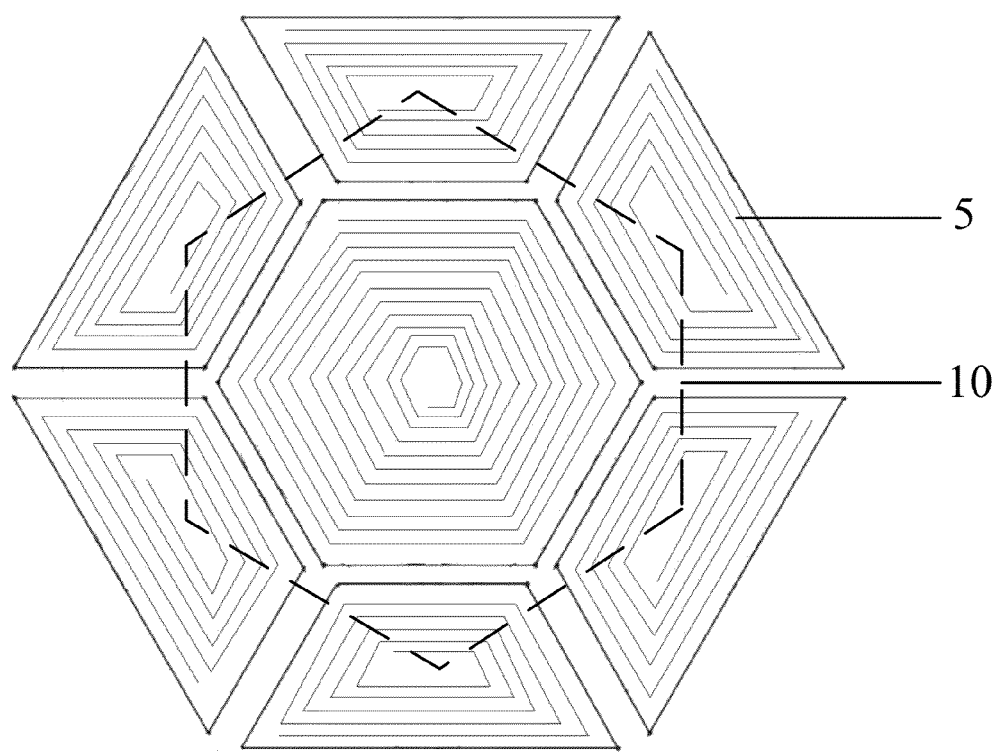

FIGS. 5A, 5B, and 5C are top plan views of seven-coil cells that may be employed in the mat of FIG. 4. Each cell 10 contains seven spiral coils 5 of a certain shape (e.g., a circular, hexagonal, or fan shape) and is individually driven by switching a multiplexer between the RF power amplifier shown in FIG. 1 and a number of hexagonal elements comprised in the driver coil array. Also, each hexagonal element in the driver coil array contains seven loops of a certain shape (e.g., a circular, hexagonal, or fan shape), just as with the spiral coils 5.

Figure 6:
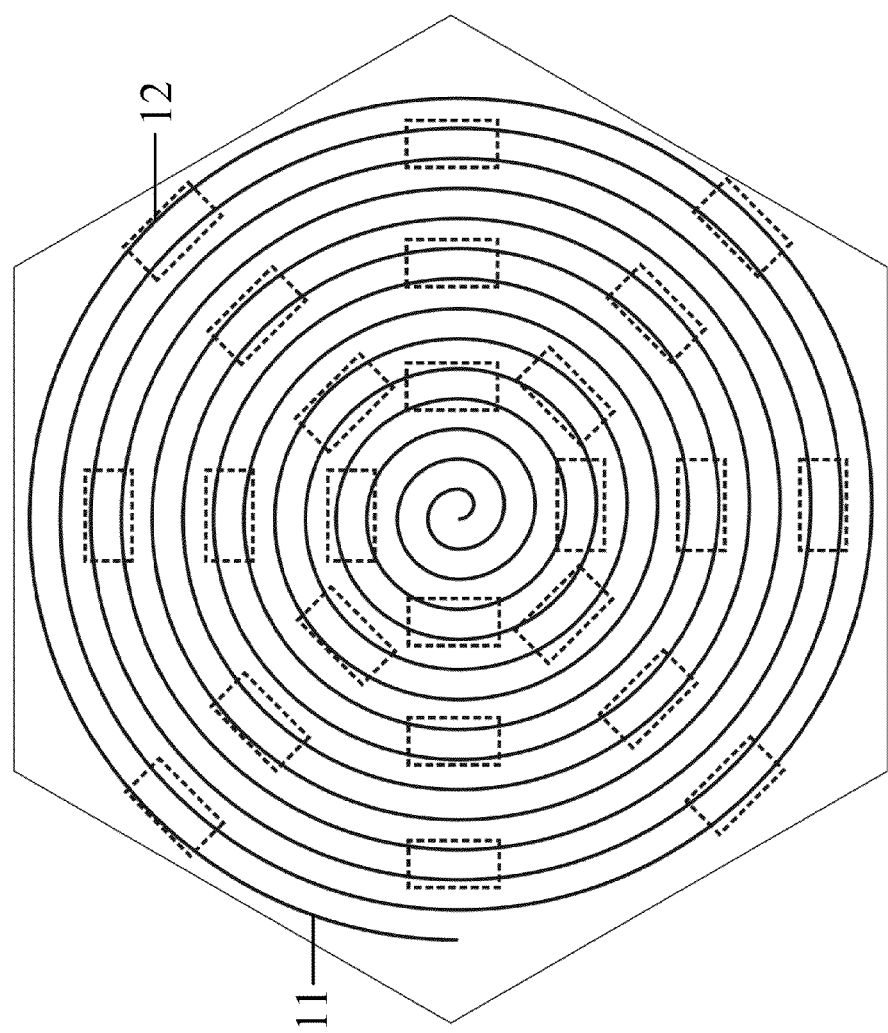
FIG. 6 is a top plan view of a planar spiral coil constructed by a printed circuit board (PCB) that may be employed in, for example, the transmitter mat of FIG. 4.
Figure 7A:
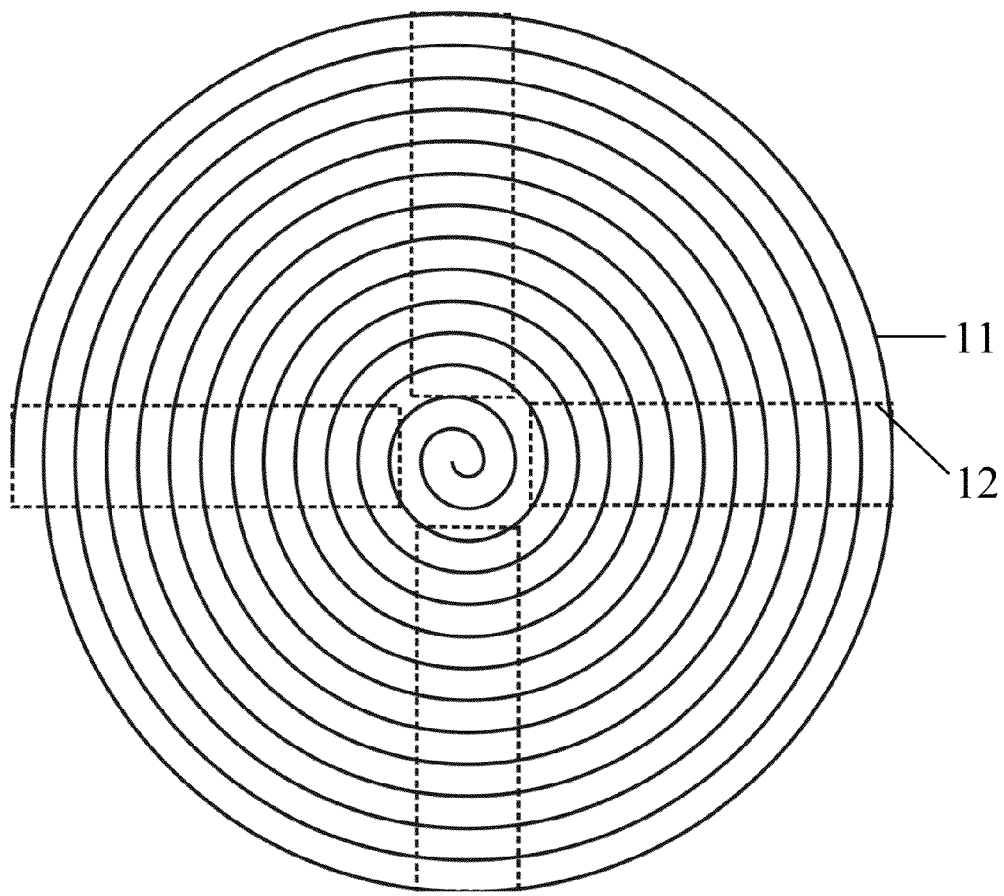
FIGS. 7A, 7B, 7C, and 7D are top plan views of planar spiral coils according to further alternative embodiments.
Figure 7B:
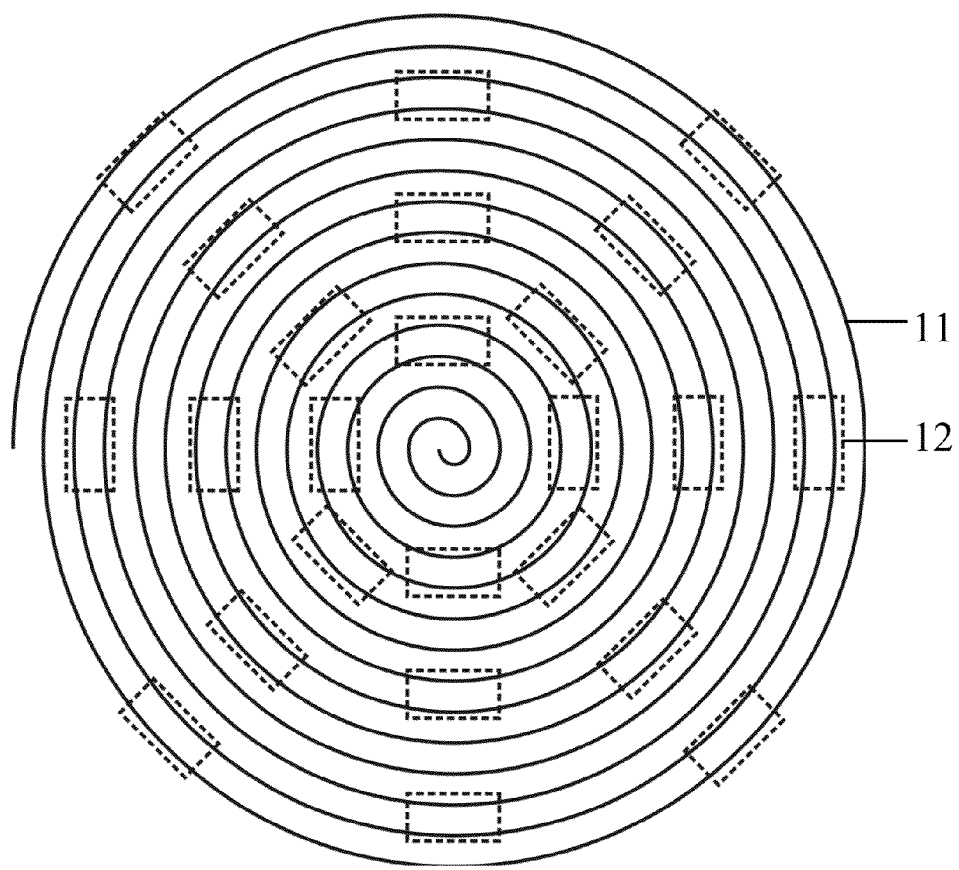
Figure 7C:
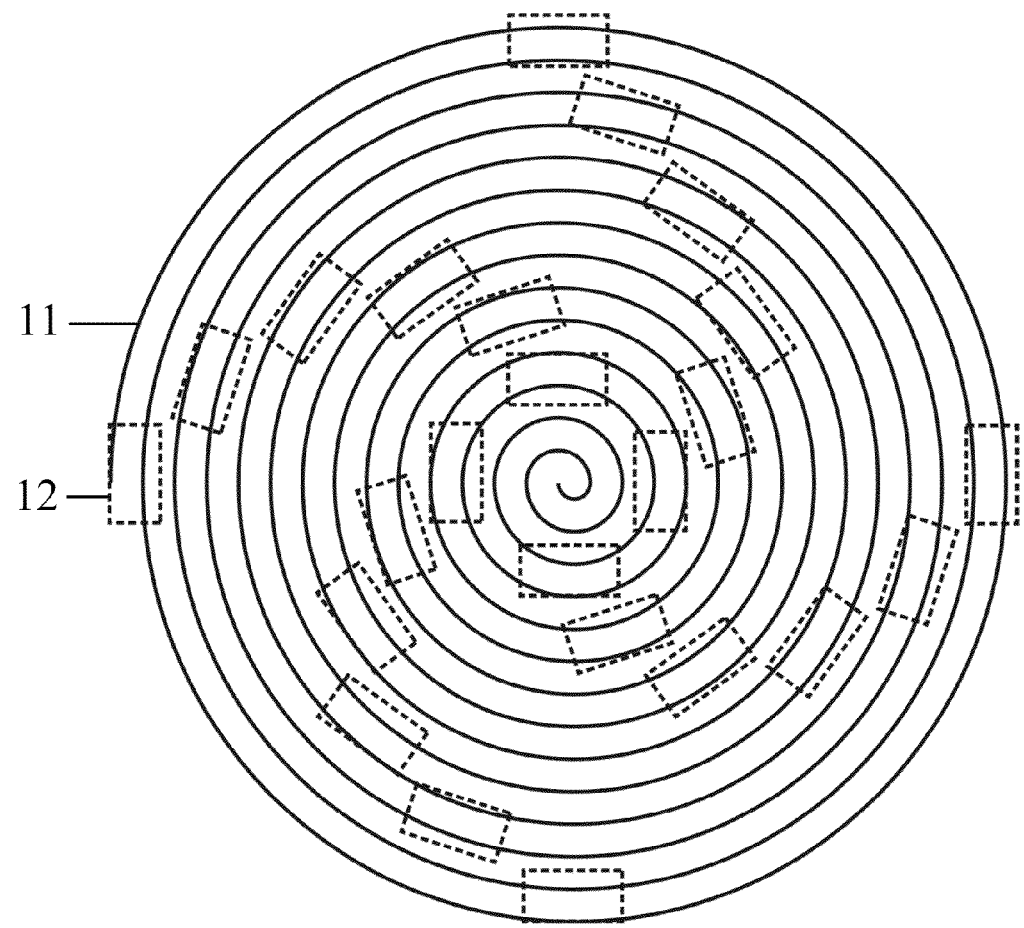
Figure 7D:
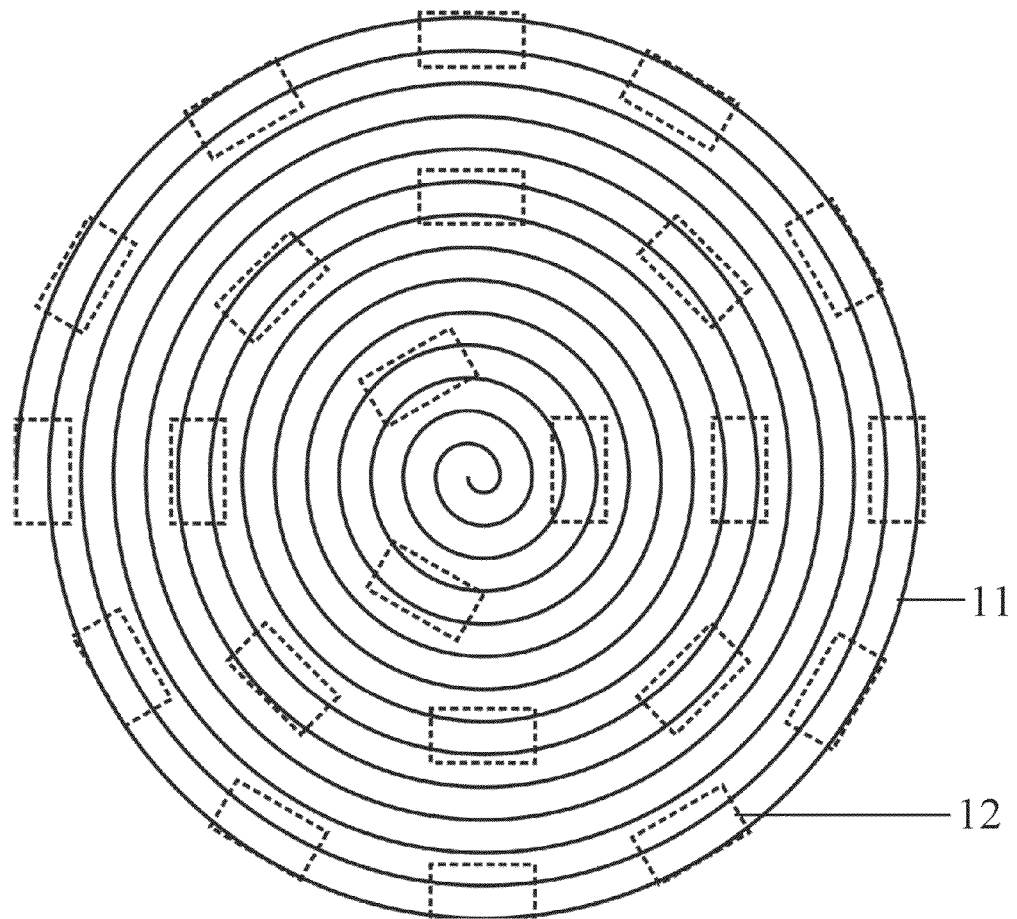

FIG. 6 is a top plan view of a planar spiral coil (PSC) constructed by a hexagonal PCB used in the transmitter coil array. On the reverse side of each PCB, several conductor strips 12 are utilized to form distributed capacitances with respect to the conductor coil 11 in the front side. By changing the sizes of these strips 12, the resonant frequencies of the PSC are adjusted. In the particular embodiment shown in FIG. 6, the circular PSC 11 in shape is meant to be exemplary only, and the PSC 12 may take on other shapes (e.g., hexagonal or fan-shaped) as shown in FIGS. 5B and 5C. Also, the conductor coils 11 and/or conductive strips 12 may have a large surface area thereof plated with silver in order to provide for small electric resistance adapting to the skin effect of RF current.

FIGS. 7A, 7B, 7C, and 7D are top plan views of PSCs that forms a compact LC tank circuit with no wire connections according to further alternative embodiments. The PSC constructed by a PCB comprises three layers. The middle layer is an insulator layer made of, comprising but not limited to, a polymer. The top layer is a circular spiral conductor coil 11 coupled to the top surface of the middle layer. The conductor coil 11 forms an inductor which captures and generates the magnetic field [i.e. it will both receive and transmit energy from and to another energy transfer coil (resonant energy exchange)], regardless of whether it is used on the transmitter or receiver side. The bottom layer comprises a number of conductive strips 12 spaced around and coupled to the bottom surface of the middle layer. The conductive strips 12 form physical capacitors with the overlapped parts of the conductor coil 11. Also, in the preferred embodiments, by changing the patterns of these strips 12, the resonant frequencies and Q-factors of the PSC 5 are selectively adjusted. This invention solves the problem of high Q value constraining resonance frequency to relatively low values for the coil design on the transmitter and receiver side.

Figure 8A:
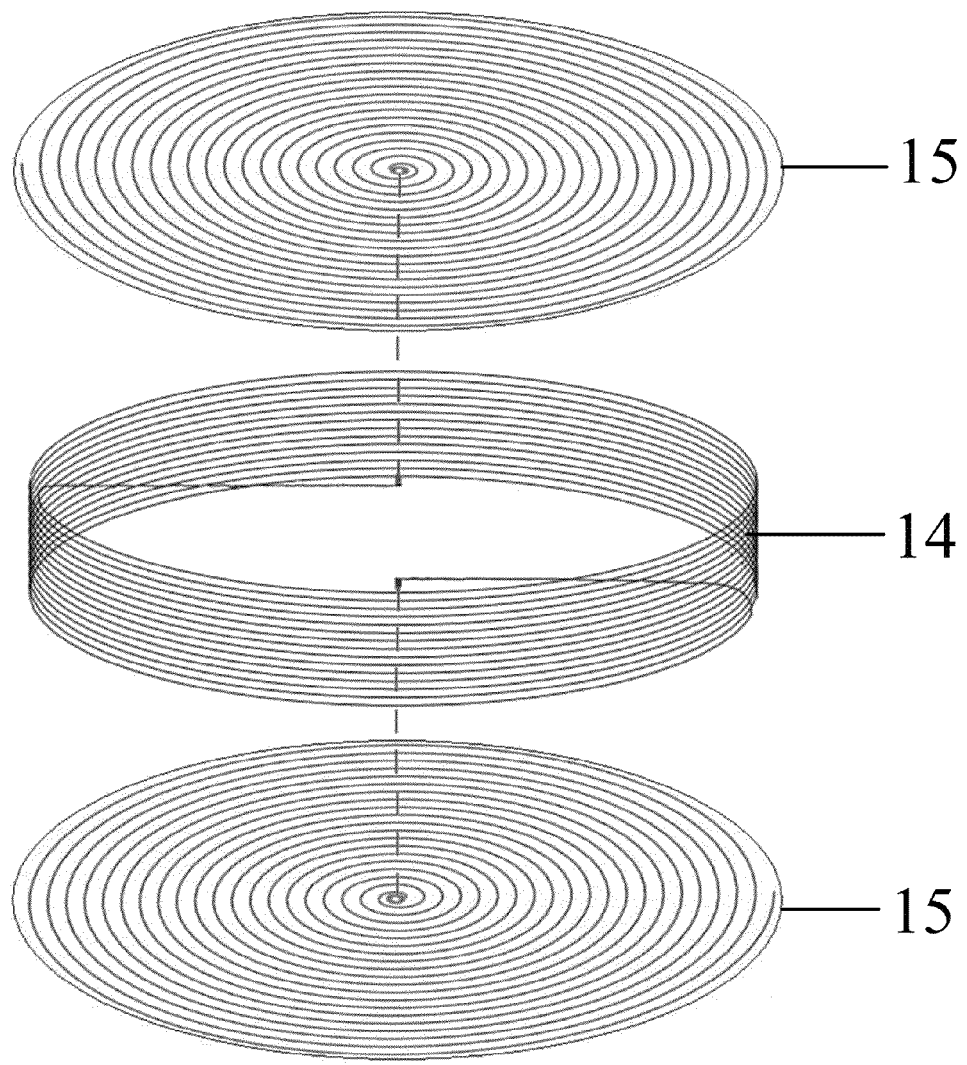
FIG. 8A is an exploded view and FIGS. 8B and 8C are isometric views of particular embodiments of the receiver coil shown in FIG. 1.
Figure 8B:
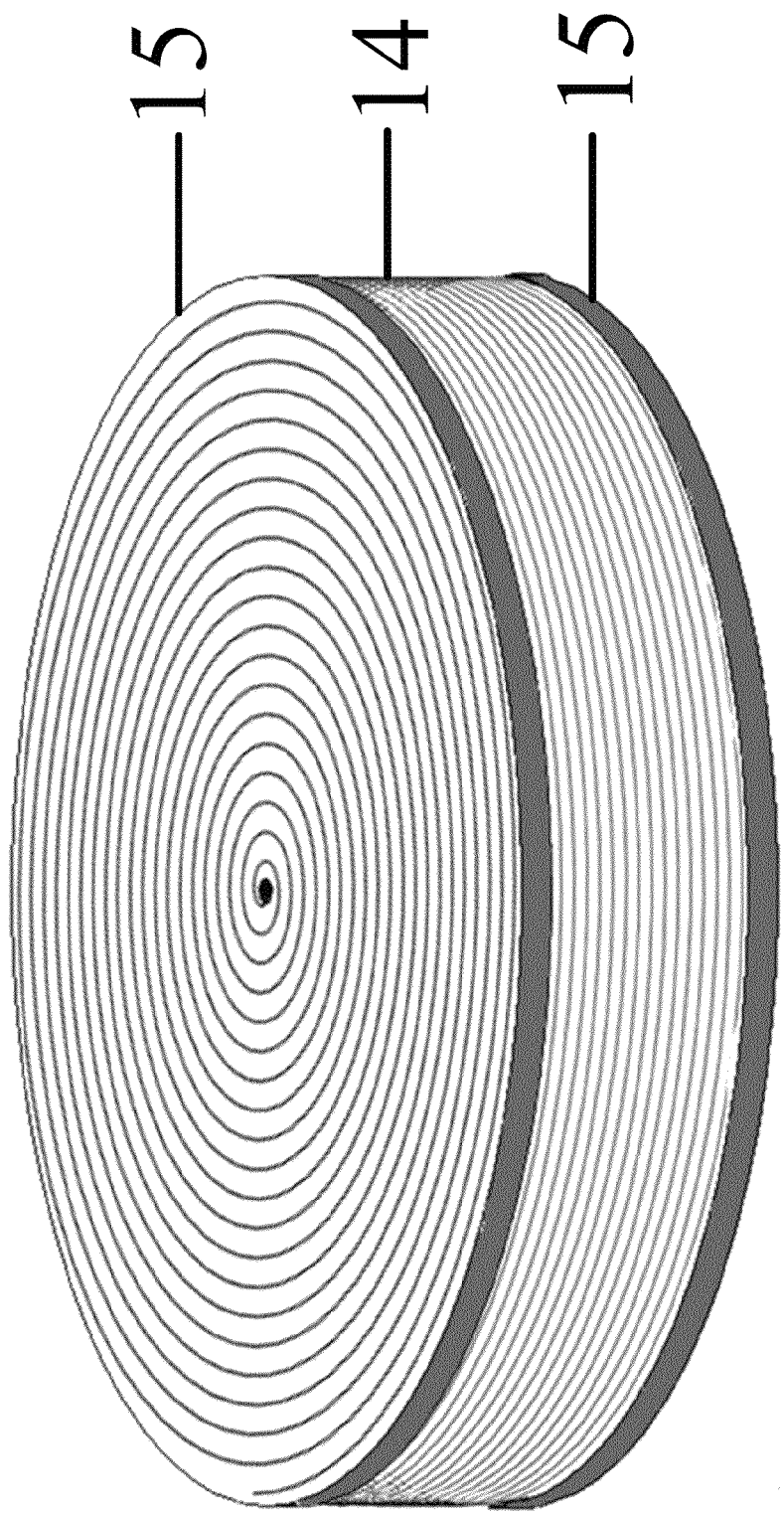
Figure 8C:
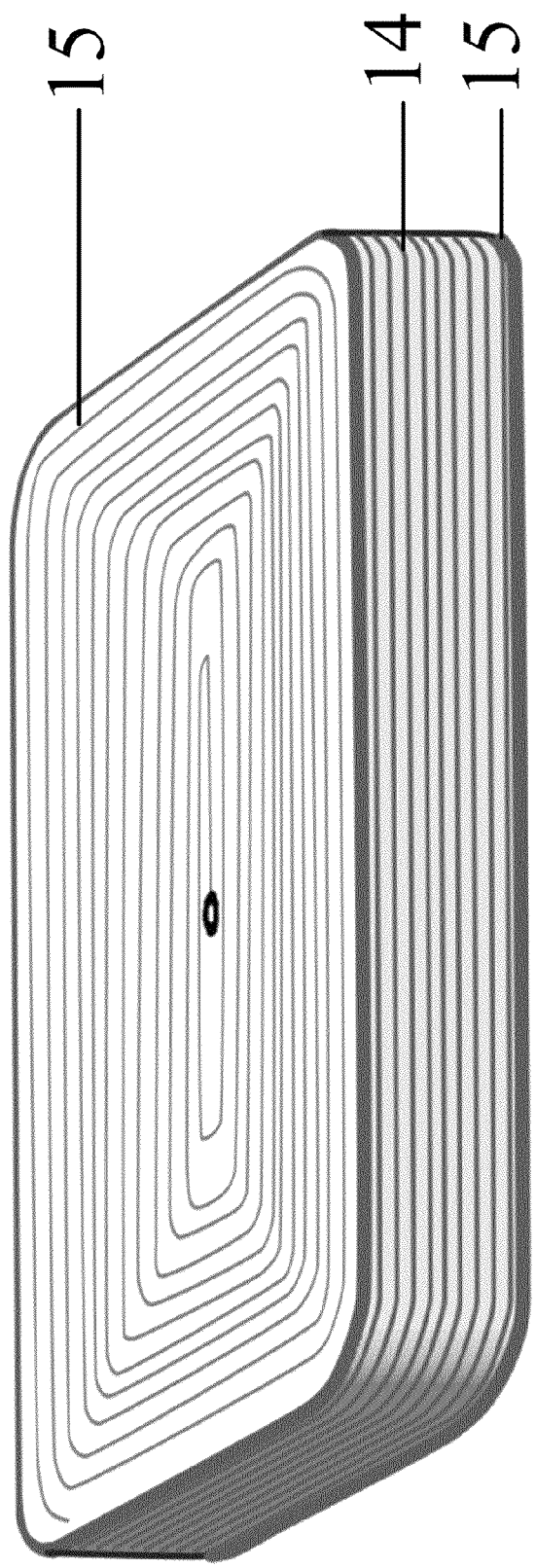

FIG. 8A is an exploded view and 8B is an isometric view of the receiver coil 3 according to a particular embodiment of the invention. The receiver coil comprises a top planar spiral sub-coil 15, a middle helical sub-coil 14, and the bottom planar spiral sub-coil 15. Three sub-coils winded in proper directions to maximally capture the magnetic field produced by the distally located transmitter coil array, are combined and connected to form a single receiver coil with a shape assembling a shallow box. Also, the receiver coil can serve as a component of the packaging material for the implant. The exterior of the receiver coil is coated or covered by a biocompatible material for biological safety. In the particular embodiment shown in FIGS. 8A and 8B, the receiver coil is cylindrical in shape in order to comply with the exterior dimensions of an associated (parent) device that is cylindrical (or circular) in shape. It should be understood that this embodiment is meant to be exemplary only, and that the receiver coil may take on other shapes (e.g., rectangular or hexagonal) in order to correspond to associated (parent) devices of other shapes.

Figure 9:
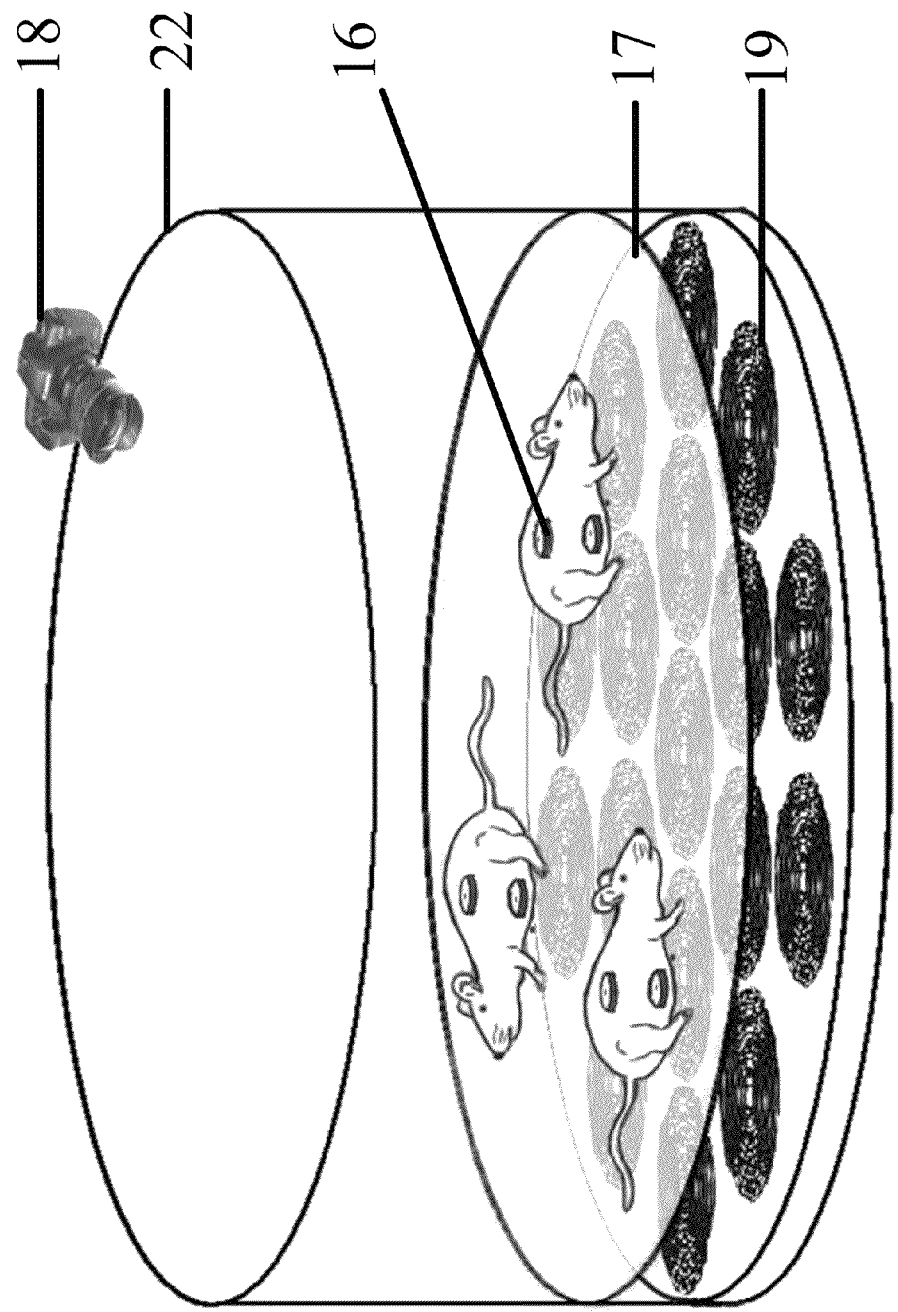
FIGS. 9 and 10 are schematic diagrams of wireless electricity for a medical implant according to different embodiments of the invention.

FIG. 9 is a schematic diagram of a free-access wireless electricity system for medical implants in laboratory animals (e.g., rats) according to one embodiment of the invention. Experimental rats with implanted electronic devices 16. The electronic circuit of the implant is placed within the receiver coil, moves freely in a container 22 on a height-adjustable floor 17 above a power mat 19. The driver coil array, connected to an RF power amplifier, is placed below the mat 19, which creates a nearly uniform distributed magnetic field so that the implants 16 within the body can receive wireless power effectively regardless of the location of the subject on the floor 17. If many free-moving animals are utilized in a single experimental study, one power source can be used to operate all implants 16 simultaneously. If a single animal is studied, power can be delivered to a hexagonal cell where the animal is located and tracked by a target positioning device 18 (e.g., digital cameras) mounted on top of the container 22 used to determine which standard hexagonal cell 10 in the mat 19 is to be individually powered.

Figure 10:
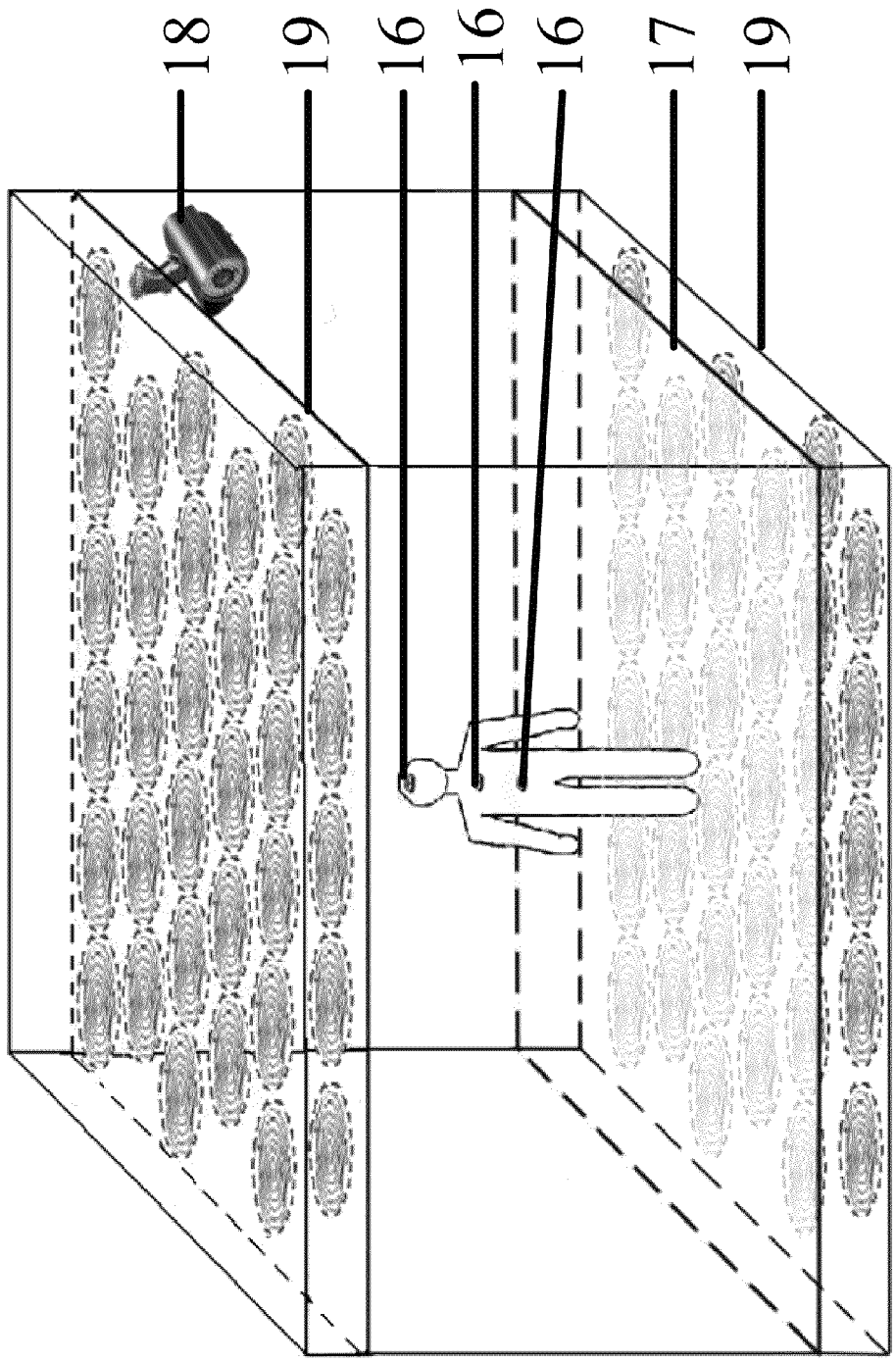

FIG. 10 is a schematic diagram of a wireless electricity system for medical implants in a human subject according to another embodiment of the invention. A hexagonally packed transmitter mat 19 as shown in FIG. 4 delivers transcutaneous power to implanted devices 16 when the human subject moves freely on the floor 17 above the mat 19. For a certain distance between the transmitter and receiver, the vertical component of the magnetic field is relatively uniform over the area defined by the hexagonal packed transmitter (HPT) mat, and the coupling between the HPT mat and the moving receiver resonator is almost constant. Also, the same mat 19 is placed within the ceiling (or within both the floor and the ceiling) of a room which is more suitable for humans in a living quarter. Also, a target position tracking device 18 (e.g., digital cameras) mounted on the ceiling, or a fixed frame, can be used to determine which standard hexagonal cell in the mat 19 is to be powered.

Figure 11:
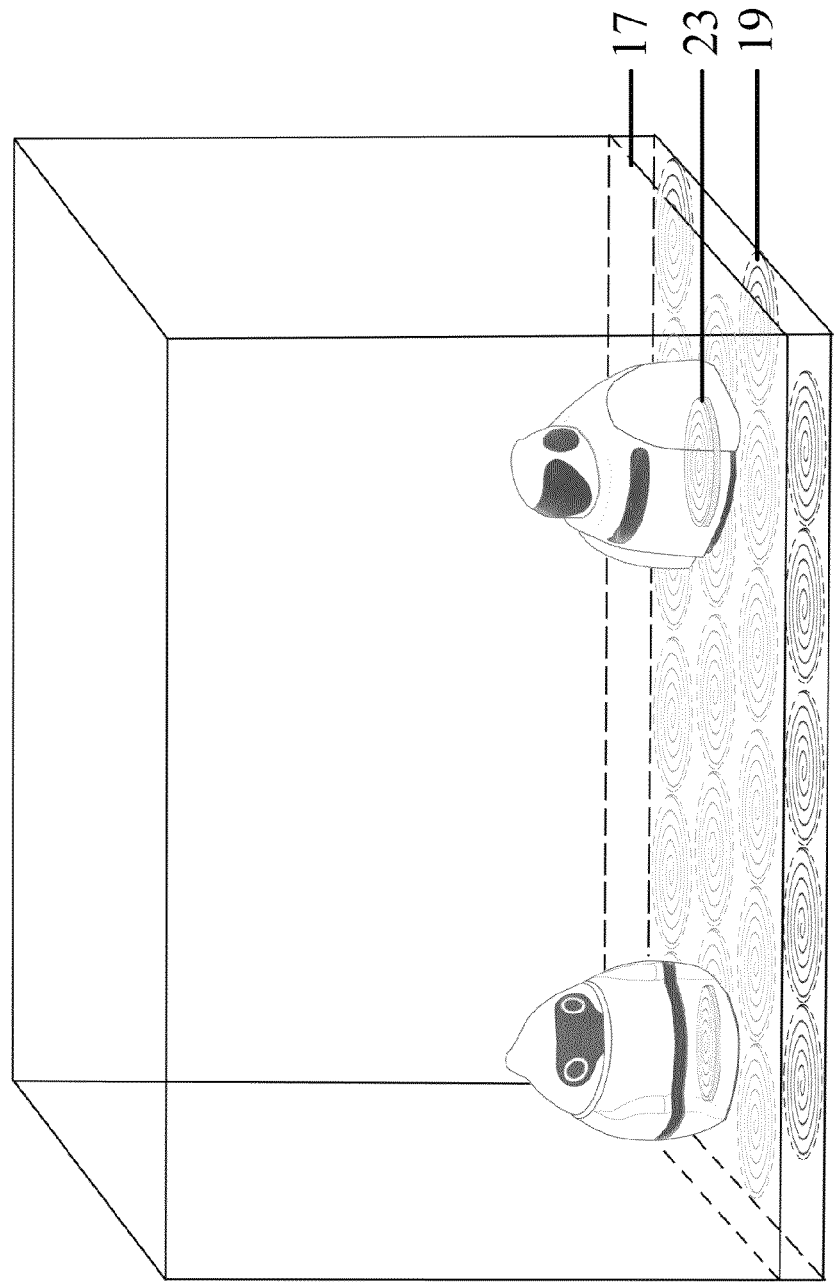
FIG. 11 is a schematic diagram supplying wireless electricity to mobile robots according to a particular embodiment of the invention.

FIG. 11 is a schematic diagram of wireless electricity for mobile robots according to a particular embodiment of the invention. The battery-driven mobile robot is recharged while moving on the floor 17 above a hexagonally packed mat 19 within a work space. The power is wirelessly transferred to the receiver resonator 23 in the robot via strongly coupled magnetic resonance.

Figure 12:
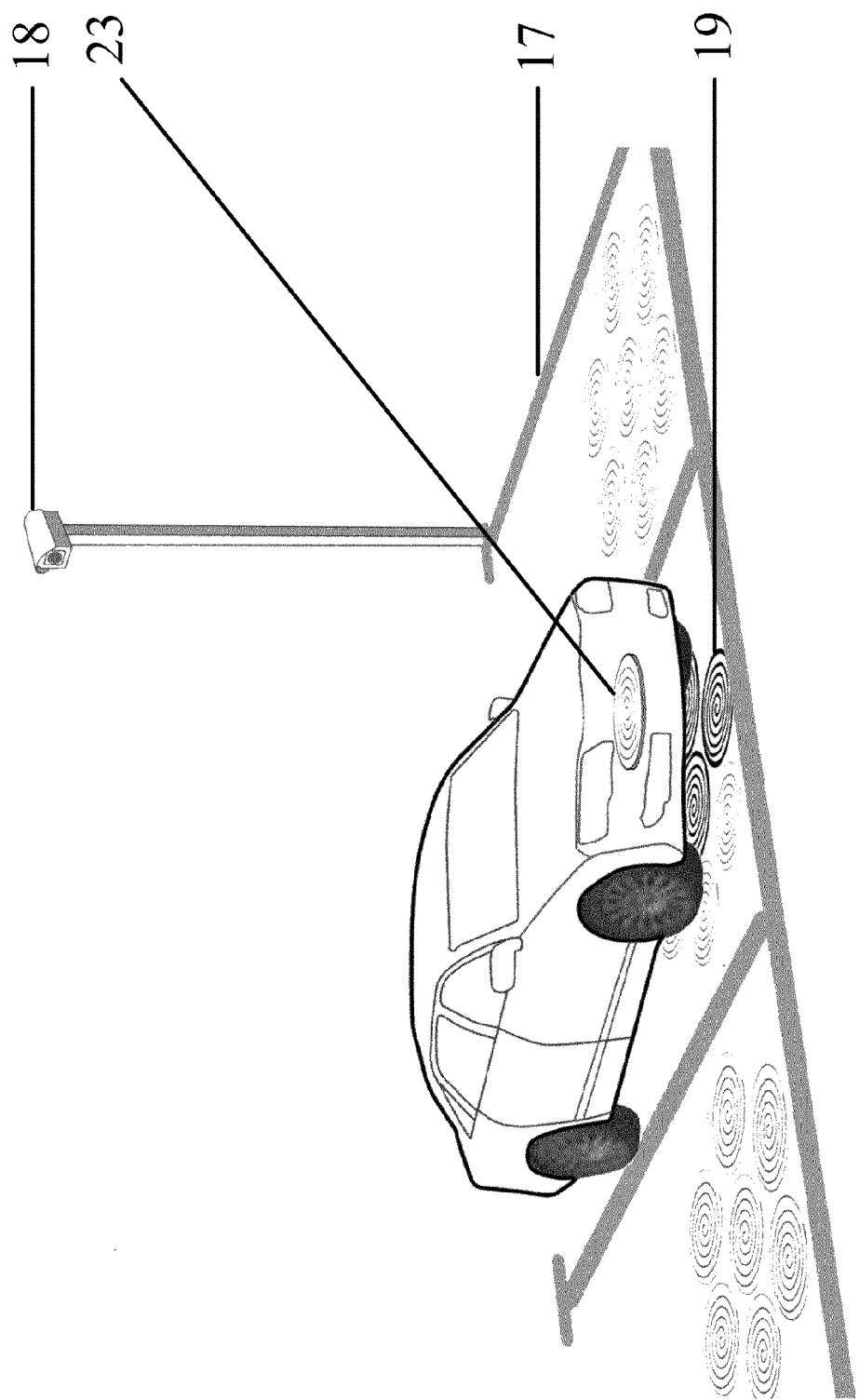
FIG. 12 is a schematic diagram supplying wireless electricity to EVs according to a particular embodiment of the invention.

FIG. 12 is a schematic diagram of wireless electricity for charging EVs according to another embodiment above a power mat 19 that enables a highly efficient WPT to recharge an EV's battery via resonant magnetic coupling between the transmitter mat 19 and the receiver resonator 23 located on the bottom of the vehicle. Also, a target position tracking device 18 (e.g., digital cameras) mounted on the ceiling or fixed frame mount can be used to determine which coils in the mat 19 transmit power. These three active coils (indicated by bold lines) are in close proximity to a receiver coil. In this embodiment, three out of seven coils transmit power within the cell, allowing optimal wireless power transfer by automatic tracking of the parking position of the car. At a greater scale, hexagonally packed mats can be located below an all-electric highway to wirelessly charge cars and trucks as they cruise down the road.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A resonance-based wireless power transfer system, comprising:
    a) a load;
    b) a drive coil array, said drive coil array comprising a number of driver coils, said driver coils injecting RF energy to maintain resonance in the presence of losses and power drawn by the load;
    c) a transmitter coil array, said transmitter coil array comprising a number of transmitter coils magnetically coupled to said driver coil array, said transmitter coils having at least one resonant frequency and acting as an energy transmitter;
    d) a receiver coil, said receiver coil having at least one resonant frequency, capturing magnetic field produced by said transmitter coil array, and acting as an energy receiver; and
    e) a load coil, said load coil being magnetically coupled to said receiver coil for receiving RF energy;
    wherein:
    said transmitter coil array and said receiver coil have the same resonant frequency or frequencies, each pair of said driver coil and said transmitter coil forms a voltage step-up transformer to produce a strong resonance for wireless power delivery to said receiver coil within a body, and said load coil is operatively coupled to power said load;
    said receiver coil is hollow and comprises two end covers and a side wall;
    said two end covers are connected to each other via said side wall;
    an inner cavity is formed inside said receiver coil by said two end covers and said side wall;
    each of said two end covers is a planar spiral coil;
    said side wall is a helical coil; and
    said load coil is placed inside said inner cavity and is magnetically coupled to said receiver coil.

2. The system of claim 1, wherein
    said transmitter coils are hexagonally packed to form a transmitter mat;
    said transmitter coils are grouped into standard hexagonal cells;
    each of said standard hexagonal cells comprises seven transmitter coils constructed by hexagonal PCBs (printed circuit board); and
    said transmitter mat generates uniform magnetic field for free-access wireless electricity via magnetically resonant coupling between said transmitter mat and said receiver coil as a moving target.

3. The system of claim 2, wherein each of said standard hexagonal cells is individually driven.

4. The system of claim 2, wherein a target position tracking device is used to determine which of said standard hexagonal cells or which of said transmitter coils are to transmit power.

5. The system of claim 2, wherein a second plurality of planar spiral coils are constructed in a front side by said hexagonal PCBs, several conductor strips on a reverse side of each of said hexagonal PCBs are utilized to form distributed capacitances with respect to said second plurality of planar spiral coils on the front side.

6. The system of claim 5, wherein each of said conductor strips covers only two adjacent tracks of said second plurality of planar spiral coils, and each of said PCBs comprises a plurality of conductive strips to form distributed capacitances.

7. The system of claim 2, wherein said transmitter coil is a circular spiral.

8. The system of claim 2, wherein said transmitter coil is a square or rectangular spiral.

9. The system of claim 2, wherein said transmitter coil is a fan-shape spiral.

10. The system of claim 2, wherein conductor coils and/or conductive strips have a large surface area thereof plated with silver to provide for small electric resistance adapting to the skin effect of RF current.

11. The system of claim 1, wherein
    said driver coil array comprises a number of hexagonal elements, each element consisting of seven loops;
    said seven loops are all connected in parallel to a pair of open coaxial conductor rings which are further connected to the output of an RF power amplifier; and
    a gap is made at each ring to avoid harmful loop current generated by an RF magnetic field.

12. The system of claim 11, wherein said elements are individually activated.

13. The system of claim 1, wherein the exterior of said receiver coil is coated or covered by a biocompatible material.

14. The system of claim 1, wherein said receiver coil is cylindrical in shape in order to comply with exterior dimensions of an associated (parent) device that is cylindrical or circular in shape.

15. The system of claim 1, wherein said receiver coil takes on a rectangular shape in order to correspond to associated devices of rectangular shape.

16. The system of claim 1, wherein said planar spiral coil is circular, rectangular, or hexagonal.

* * * * *